United States Patent
Kahn et al.

(10) Patent No.: US 6,574,628 B1
(45) Date of Patent: *Jun. 3, 2003

(54) SYSTEM FOR DISTRIBUTED TASK EXECUTION

(75) Inventors: Robert E. Kahn, McLean, VA (US); Vinton G. Cerf, Annandale, VA (US); David K. Ely, Oakton, VA (US)

(73) Assignee: Corporation for National Research Initiatives, Reston, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,021
(22) Filed: Oct. 21, 1997

Related U.S. Application Data

(63) Continuation of application No. 08/453,486, filed on May 30, 1995, now abandoned.

(51) Int. Cl.[7] .............................. G06F 17/30
(52) U.S. Cl. ................ 707/10; 707/100; 707/103; 707/104; 709/1; 709/100; 709/200; 709/217
(58) Field of Search .................. 395/200.32; 345/680; 707/10, 103, 104, 100; 709/1, 100, 200, 217

(56) References Cited

U.S. PATENT DOCUMENTS

| | | | |
|---|---|---|---|
| 4,827,508 A | 5/1989 | Shear | |
| 4,977,594 A | 12/1990 | Shear | |
| 5,047,948 A | 9/1991 | Turner | |
| 5,050,213 A | 9/1991 | Shear | |
| 5,241,671 A | 8/1993 | Reed et al. ................. 395/600 |

(List continued on next page.)

FOREIGN PATENT DOCUMENTS

| | | |
|---|---|---|
| EP | 0 634 719 A | 1/1995 |
| EP | 0 329 681 B1 | 1/1996 |
| WO | WO 88/02960 | 4/1988 |

OTHER PUBLICATIONS

Microsoft Press Computer Dictionary, Second Edition, Redmond, Washington, pp. 83–84, 321, (Jan. 1994).*

Lean et al., Query Analysis Specifications for SNMP, IEEE, vol. 2, pp. 1451–1454, Aug. 1994.*

Yemini, The OSI Network Management Model, IEEE, vol. 31, pp. 20–29, May 1993.*

Orgill et al., An Application of a Multiple Agent System for Flexible Assembly Tasks, IEEE, pp. 3/1–3/9, 1989.*

Wolfson et al., "Intelligent Routers", IEEE, CH2706–0/89/0000/0371, 1989.

Tsichritzis et al., "KNOs: Knowledge Acquisition, Dissemintion, and Manipulation Objects", ACM Transactions on Office Information Systems, vol. 5, No. 1, Jan. 1987, pp. 96–112.

(List continued on next page.)

*Primary Examiner*—Frantz Coby
(74) *Attorney, Agent, or Firm*—Fish & Richardson P.C.

(57) ABSTRACT

Tasks can be done on a network of multiple computers interconnected by communication links. At each of the computers, Knowbot programs may be received and transmitted on the communication links, and may be stored and created; and execution of the tasks associated with the Knowbot programs may be advanced. Each Knowbot program includes a globally unique identifier; navigation information defining a route through the network; and information concerning a task to be done. Knowbot programs may interact with each other and with other network resources. Authenticated Knowbot service stations and Couriers may be used to protect data as well as control its application in the network environment according to stated terms and conditions.

59 Claims, 7 Drawing Sheets-

U.S. PATENT DOCUMENTS

| | | | |
|---|---|---|---|
| 5,260,999 A | | 11/1993 | Wyman |
| 5,390,281 A | | 2/1995 | Luciw et al. |
| 5,410,598 A | | 4/1995 | Shear |
| 5,423,043 A | | 6/1995 | Fitzpatrick et al. |
| 5,499,364 A | * | 3/1996 | Klein et al. ............ 395/200.32 |
| 5,546,594 A | * | 8/1996 | Wazumi ..................... 395/676 |
| 5,603,031 A | | 2/1997 | White et al. ................ 395/683 |
| 5,655,081 A | * | 8/1997 | Bonnell et al. ........ 395/200.32 |
| 5,692,047 A | | 11/1997 | McManus |
| 5,710,918 A | * | 1/1998 | Lagarde et al. ............ 395/680 |
| 5,745,754 A | | 4/1998 | LaGarde et al. |
| 5,754,857 A | | 5/1998 | Gadol |
| 6,157,941 A | | 12/2000 | Verkler et al. |

OTHER PUBLICATIONS

Casais, "An Object Oriented System Implementing KNOs", ACM 0–89791–261–6/88/0003/0284, 1988, pp. 284–290.

Robert E. Kahn et al., "The Digital Library Project", vol. 1: The World of Knowbots, An Open Architecture for a Digital Library System and A Plan for Its Development, Mar. 1988.

Shoch et al., "The 'Worm' Programs—Early Experience with a Distributed Computation", Communications of the ACM, vol. 25, No. 3, Mar. 1982, pp. 172–180.

Schmidt and Darby, "The Internet Worm", Website Page, The Robert Morris Internet Worm.

Kahn, "Deposit, Registration and Recordation In An Electronic Copyright Managment System", 1992.

CNRI Brochures, Workshop on the Protection of Intellectual Property Rights in a Digital Library System, "Knowbots in the Real World", May 18–19, 1989.

Daviss, "Knowbots", Discover, p. 21 (Apr. 1991).

Markoff, "For PC's , a New Class of Software", New York Times (Mar. 8, 1989).

Markoff, "Computer Project Would Speed Data", New York Times (Jun. 8, 1990).

Markoff, "A Supercomputer in Every Pot", New York Times (Dec. 12, 1988).

Markoff, "Creating a Giant Computer Highway", New York Times (Sep. 2, 1990).

Cerf, "Networks", Scientific American, 265:3:72 (1991).

Breeden, "The Information Infrastructure: An Interview with Robert Kahn", CSNET News, 18:1 (Fall 1988).

Higgins, "Reston's Information Highway", Virginia Business (Feb. 1993).

Guterl, "Bob Kahn Wants to Wire the Nation", Business Month, p. 30 (Apr. 1987).

Lawrence, "Work Starts on Superhighway of Knowledge", Los Angeles Times (Aug. 17, 1986).

Barney, "Kahn and Cerf Pursue 'A Civilian Arpanet'", Electronics (Oct. 16, 1986).

Anthes, "Building Information Highways, Bridges", Washington Business Journal (Oct. 27, 1986).

"Interview–Robert E. Kahn", Omni, p. 83 (Dec. 1992).

Peterson, "Highways for Information", Science News, 133:394 (1988).

Kahn, "A National Network: Today's Reality, Tomorrow's Vision, Part 2", Educom Bulletin, p. 14 (Summer/Fall 1988).

Anthes, "Firm Connects MCI's E–mail With Internet", Federal Computer Week, (Jun. 12, 1989).

Anthes, "NSF Backs Proposal for Research of Nationwide Gigabit Network", Federal Computer Week, p. 5 (Aug. 28, 1989).

Anthes, "NRI's Kahn Forms Info of Future", Federal Computer Week, (Jan. 22, 1990).

"A Superhighway for Computers", Virginia Business, p. 10 (May 1991).

"One Man's Dream of a Nationwide Digital Information Superhighway is Taking Shape", The Added Dimension, 1:6 (Apr. 1991).

Calicchio, "Researching for the Revolution", Communications Week, (Apr. 1991).

Jenks, "Information Infrastructure Tops Hill's Science Agenda", Washington Technology (Mar. 21, 1991).

Jenks, "Reston Networking", Washington Technology (Dec. 6, 1990).

Stix, "Gigabit Connection", Scientific American, p. 118 (Oct. 1990).

"A Talk with Dr. Robert Kahn, Part 1: National Research Initiatives", The CPSR Newsletter, 5:2:8 (Spring 1987).

Roth, "Designer Shares Vision of National Infrastructure", Government Computer News (Apr. 24, 1987).

CNRI—Building a Strategic Advantage in American Brochure.

Vision of a National Information Infrastructure.

Hill, "Magic Cap System is Expected to Glue Users of Hand–Held PCs An Easier Time", Wall Street Journal.

Levy, "Bill and Andy's Excellent Adventure II", Wired (Apr. 1994).

Burgess, "Calling Agent 486", Washington Post (Mar. 6, 1994), p. H1.

Cerf, "Warming Trend with Turbulence in the Lower Layers", IEEE Spectrum (Jan. 1993).

Congressional Testimony of Vinton Cerf (Jul. 11, 1991).

Kahn, "Networks for Advanced Computing", Scientific American, 225:10:136 (1987).

Cerf, "Another Reading of the NREN Legislation", Telecommunications, p. 29 (Nov. 1991).

Dan Amdur, Untitled, Jan. 16, 1996.

Lingnau et al., "An HTTP–Based Infrastructure for Mobile Agents", World Wide Web Journal, Nov. 1, 1995.

Sibert et al., "DigiBox: A Self–Protecting Container for Information Commerce", First Usenix Workshop on Electronic Commerce, Jul. 1995.

Bharat et al., "Distributed Applications in a Hypermedia Setting", World Wide Web, Jun. 1995.

Bharat et al., "Migratory Applications", World Wide Web, May 13, 1995.

EPR Electronic Commerce Technologies, "Breakthrough Digital Rights Protection Information Metering Architecture with a Universal Digital Content and Commerce Container", EPR Press Release, Apr. 10, 1995.

King et al., Competitive Intelligence, Software Robots and the Internet: The NewsAlert Prototype, Proceedings of the 28th Annual Hawaii International Conference on Systems Sciences, 1995.

Andy Reinhardt, "The Network with Smarts",BYTE, Oct. 1994.

"PowerBuilder Toolset for the 90s", Powersoft Corporation, Apr. 1991.

Copyright Clearance Center, Inc., Online, press release, "About CCC", New York, Apr. 1995.

Electronic Publishing Resources, Online, press release, "EPR", 1995.

Vanderburg, Glen L. et al., "Tricks of the Java Programming Gurus", Sams.net Publishing, see Chapter 33, entire chapter, p. 14, (Jan. 1995).

Perkins, Chalres L., "The Big Picture", Java report, http://www/sigs.,com, pp. 47–53 (1996).

Rasmus, Daniel W., "Intelligent Agents," PCAI, p. 8.

Orfali et al., "Essential Client/Server Survival guide", Van Nostrand Reinhold, pp. 32–35, 367–381, 439–441 (1994).

Orfali et al., "Client/Server Programming with CORBA Objects", OS/2 Magazine, p. (8), (Sep. 1994).

Prabhaker, Ernest N., "Implementing Distributed Objects", Dr. Dobb's Journal, p. (11), (Aug. 1995).

Markoff, John, "The Staggering Scope of the Internet: A Thicket of Networks Wound 'Round the Globe'," Digital Media, vol. 1, No. 11, p.19(5), Apr. 1992.

"Good Knowbot, Fetch!", Data Communications, p. 24, vol. 25, No. 5, Apr. 1996.

Anthes, Gary H., "Internet Makes Users KIS–ing Cousins," Computerworld, pp(2), Dec. 1994.

Hedberg, Sara Reese, "Intelligent Agents: the First Harvest of Softbots Looks Promising", IEEE Expert, p. (7), Aug. 1995.

Kessler et al., "A Primer on Internet and TCP/IP Tools", Network Working Group, p. 20, (Dec. 1994).

Malkin et al., "FYI on Questions and Answers, Answers to Commonly asked 'New Internet User' Questions", Network Working Group, p. 21, (May 1992).

Malkin, G., ed., "Internet Users' Glossery", Network Working Group, p. 33, (Aug. 1996).

Kahn et al., "An Open Architecture for Digital Library System and A Plan for Its Development", The Digital Library Project, vol. 1, Internet Draft, 'Online'! 1988, pp. 1–48.

Wayner, "Agents Away Telescript Is A Sophisticated Communications Language That Is The Centerpiece of A New Style of Information Network—The Electronic Marketplace", Byte, vol. 19, No. 5, May 1, 1994, pp. 113–114, 116, 188.

Etzioni et al., "Building Softbots for UNIX", Software Agents, Papers from the 1994 AAAI Spring Symposium, Proceedings of AAAI Spring Symposium Series 1994, Mar. 21–23, 1994.

Griggs, "Organization Construction Set'–Modeling Organizations With Visual Agents", Proceeding of the Twenty–Sixth Hawaii International Conference On System Sciences, Jan. 5–9, 1993, vol. 4, pp. 320–328.

Kaneda et al., "Multi–Agent Programming System On A Workstation Network", Proceedings of the Pacific Rim Conference on Communications, Computers, and Signal Processing, Victoria, British Columbia, May 17–19, 1995, pp. 315–318.

Etzioni, O., et al, "A Soft–bot Based Interface to the Internet", Communications of the ACM, Jul. 31, 1994, vol. 37, No. 7, pp. 72–76.

Kahn et al., "A Framework for Distributed Digital Object Service", CNRI, dlib/tn95–01, May 13, 1995.

A pamphlet of International Publication 95/2219.

* cited by examiner

SYSTEM FOR DISTRIBUTED TASK EXECUTION

This is a continuation of application Ser. No. 08/453,486, filed May 30, 1995, now abandoned.

This invention relates to distributed task

Glossary of Terms

Below, for convenience, we set forth a short glossary of terms which supplement explanations of certain terms used in the main text.

"Network" is set of computers and a communication medium which interconnects them.

"Network participant" is an entity that may require a task to be done and has access to a distributed network.

"Packet" is an elemental container for carrying data in a distributed system; it typically includes addressing information used in routing.

"Protocol" is a set of commonly agreed rules which define the structure, format, procedure and/or function that must be followed for elements of a distributed system to communicate with each other.

"Resource" is information or a service accessible at a location in a distributed system.

"Task" is something capable of being done using one or more resources.

"Digital object" generally means sequences of digits (containing digital representations of virtually any kind of information) including an associated unique identifier, called its "handle."

"Repository" is a resource that stores digital objects and makes them accessible over the network according to applicable terms and conditions.

"Database" is an organized body of information structured so as to analyze queries and furnish replies. A digital object may itself contain a database or elements of a database.

"Rights holder" is a person or entity which has legally enforceable "rights" in a digital object.

"Distributed system" may include a Knowbot system, as well as components which are outside the Knowbot system, such as magnetic diskettes, optical disks, and other large scale storage media, including digital representations of data on paper.

"Knowbot program" is an executable computer program, which may be capable of moving from one location to another. It includes an "instruction sequence" which defines a series of steps to perform a task and also includes other data.

"Courier" is used, on occasion, to refer to an instance of a Knowbot program which is engaged in moving through a distributed system.

"Knowbot system" is a system (including programs) for creating, storing, and moving Knowbot programs among computers, executing the programs, and moving to and storing the results as needed at destination computers or the Network.

"Knowbot service station" is software and/or hardware operating at a location on a network and capable of actions such as generating, storing, executing and deleting Knowbot programs.

"Knowbot service environment" is a medium for handling Knowbot programs and comprises a collection of Knowbot service stations. The Knowbot system provides the service environment.

"Knowbot framework" is a conceptual model which defines a currency (Knowbot programs) for task execution and a medium (Knowbot service environment) for handling the programs.

"Notification authority" is a part of the Knowbot service environment which stores information about operations performed by Knowbot programs.

"Prospective Knowbot programs" are Knowbot programs received by a Knowbot service station from a source outside the Knowbot service environment.

Introduction

In the most basic sense, the invention concerns itself with a system (we call it the Knowbots system) for creating, storing and moving programs among computers, executing the programs and moving to and storing the results as needed at destination computers. While most or all of the computers may be "online" and part of a general computer networking environment, the concepts apply also to offline movement of programs via other media such as magnetic diskettes, optical disks, and other large scale storage media, including digital representations of data on paper (such as bar coding). Moreover, the computers in the system need not be simultaneously connected in an underlying network at all times; this connectivity may come and go from time to time. The label "system" generally implies some systematic regularity in the way these programs are created and managed, the way they interact with each other, the way they interact with stored information, and the way they interact with external systems, including people and programs which are considered to exist outside the scope of the definition of the programs and computers which are part of the system.

For purposes of explanation, we sometimes use the term "Knowbot® system" (Knowbot® is a registered trademark of the Corporation for National Research Intiatives) to refer to portions or all of the system. The Knowbot® system has well-defined boundaries which make it possible to distinguish the components that are part of the system from components which are outside of it and which interact with it only in ways defined by the system. What is inside the Knowbot system and what is outside may together be called a distributed system. The parts which are considered inside the system interact with other parts only in prescribed ways. The rules which define proper behavior are, in effect, specifications which determine how a component can be created and can operate so as to always be considered a properly functioning component of the system.

The Knowbot® system is largely a software system whose components are programs which operate in pre-scribed ways. Software operates in a computer-based (hardware) environment and often in association with software-based operating systems which are the basic programs that create, allocate and manage resources on the hardware. Underlying the basic design of the Knowbot® system is the assumption that the computers on which the system is operated have operating systems which provide functions needed by the Knowbot® system running "on top of" the operating systems. Any operating system would be suitable if it supports the embedding of the underlying computers in a data communications (networking) environment and is capable of "time-sharing" multiple programs running concurrently under the overall control of the operating system. In addition, the programs (called Knowbot programs) which are capable of moving between computers must contain sufficient information to allow them to begin or resume execution as intended and the computers must provide the necessary support environment such as interpreters, schedulers, and storage. The Knowbot® system may be implemented atop a wide variety of hardware and operating systems.

It is also assumed that the computers that are part of the Knowbots system are at least intermittently connected to a common communication network so that information can pass from one computer to another from time to time, in accordance with the rules of behavior of the Knowbot® system.

The Knowbot® system links together into a common operating environment many diverse and distinct systems and resources and serves as an interconnection system between them. Information about one system or its resources may be communicated to another system via the intermediary mechanism, the Knowbot® system. The Knowbot® system may itself enable tasks to be carried out distinct from the systems and resources which participate. The Knowbots system may also facilitate these participating systems and resources to carry out a given task.

Below we discuss concepts which, when taken together, describe how a collection of software, hardware, and communication facilities can be organized to function as a Knowbot® system. Virtually all of the concepts are based on software artifacts behaving in accordance with a set of prescribed rules. These artifacts include "running programs" and also "digital objects" that are stored away in "repositories" for later access. The concepts of the invention generally are rooted in the definition and behavior of software artifacts rather than on the specifics of any particular hardware, communication network, or operating system. However, if desired, portions or all of the software could be replaced in certain instances with a system of integrated circuits (e.g., semiconductor chips) if and when the technology of very large scale integration permits.

Knowbot® programs are the basic software elements that execute in a given machine. An instance of a Knowbot® program is a Courier, the form taken by a Knowbot® program as it moves from one computer to another within the system or when it interfaces with the external world. Knowbot® programs can contain (carry) information (data) which can be made manifest in a variety of ways. Provision is made in the Knowbot® system for dealing with the arrival and departure of Knowbot® programs, for the exchange of information between Knowbot® programs and other Knowbot® programs, and for the interaction of Knowbot® programs with other parts of the Knowbot® system including information access subsystems called "repositories" and with external subsystems, including people, by means of visible, audible, or other palpable manifestations.

An important characteristic of Knowbot® programs is their ability to protect data on behalf of rights holders, to control its application in accordance with stated terms and conditions and to interpret data, rendering it in multiple ways to be visible, audible or otherwise palpable and in such a way as to permit human interactions to influence the choice of renderings.

Because the Knowbot® system has a software based open-architecture interconnection structure, it is useful to discuss, another highly successful software-based open-architecture interconnection system known as the Internet. The Internet is a rapidly growing, global "network of networks" which links millions of computers and tens of thousands of networks together. The Internet is realized through a set of minimum requirements for linking computers to each other by way of a "packet switching" environment and through observing certain format and procedural conventions ("protocols") that govern how and when and in what form information is exchanged among the computers which are part of the Internet.

As seen in FIG. 1, the Internet 10 provides a communication framework 12 for computer users located essentially anywhere in the world. Any computer 14a may send digital information to any other user 14b by observing a commonly understood packet protocol 16 and a commonly accepted addressing scheme 18. The packet protocol sets minimum rules for the structure and handling of packets which carry the digital information, including the address of the recipient. The addressing scheme sets minimal rules for addressing assignments including prevention of duplicate addresses. A computer that follows the packet protocol and the addressing scheme may be relatively confident that a packet will reach its destination and that the recipient will be able to access the digital information carried in it. On the other hand, the Internet framework makes essentially no attempt to define the physical hardware/software network components 20 that are used to format, transmit, receive, disassemble or assemble packets, and instead leaves those matters to users, groups of users, and vendors. This has resulted in an open, distributed market for implementation schemes and products.

Because the hardware/software requirements of the packet protocol are minimal, and essentially any digital information may be carried in them, they provide a "currency" 22 for exchange of digital information across a distributed network, just as paper checks provide a legal tender for exchange of economic value. The unambiguous addressing scheme and other aspects of the Internet framework in turn provide a universal medium 24 for exchange of packets, just as the unambiguous transit codes of the Federal Reserve clearinghouse provide a universal medium for exchange of checks. But the Internet framework places no limits on the physical manner in which users may create, transmit, receive, and use packets, just as the clearinghouse system places no restrictions (provided paper size and other check protocol requirements are met) on how checks are created, delivered, received, or used.

The notion of disconnecting the medium and currency for exchange of digital information on a widely distributed network (i.e., the framework) from the physical implementation (suggested by the somewhat disjointed representations 12 and 20 on FIG. 1) is a powerful one and has led to the great success of the Internet, for it permits individuals and non-commercial and commercial enterprises to participate and benefit from the Internet without requiring central control of the implementation. At the same time the Internet community is constantly working to enhance and improve the principles embodied in the commonly accepted Internet framework. This is achieved through a decentralized process in which concepts may be generated from any source, tested, and if found broadly useful, ultimately become part of the accepted framework. In this context it is largely the quality of the proposed principles that generally governs whether they become part of the framework and are widely adopted.

Another powerful feature of the Internet framework and the physical network on which it is implemented is its ability to coexist easily with other frameworks of communication and other physical networks. The Internet currently accommodates many different types of networks and communications media; in principle almost any network or communications media can become part of the Internet.

Finally, the Internet framework is highly scalable which has yielded a relatively easy expansion of the number of users worldwide.

Detailed Description

As seen in FIG. 2, in the invention, a new and more powerful framework (called a Knowbot framework 28) is created not merely for communicating digital information (as in the case of the Internet framework), but for having tasks done on behalf of network participants 30a, 30b using resources available on a distributed system 32 (e.g., the Internet, or another network). Within the phrase "network participants" we include any entity that may require a task to be done, including individuals with standalone personal computers and organizations, as well as computers and other hardware and software in the network. By "task" we mean anything that is capable of being done by resources on the network; tasks may have a wide range of complexity, and typically they involve more than merely a communication of digital information of the kind effected by delivery of a simple Internet packet containing the digital information; in particular, tasks often involve a process step to be taken at a location that is remote from the location of the entity that requires the task to be done. By "resources" we mean whatever is available on the network that can contribute to the doing of a task; this could include computer software, stored digital objects and a wide variety of services.

The Knowbot framework defines both a "currency" for having tasks of any arbitrary complexity done, and a "medium" for handling the currency as part of getting the tasks done. The currency is called Knowbot programs. A Knowbot program is a mobile emissary of a network participant which assists in executing a task to be done on behalf of the participant. This task may be carried out locally in the user's system or it may involve interactions with other systems and resources at other locations both local and/or remote. The medium for handling Knowbot programs is called a distributed Knowbot service environment or simply the Knowbot service environment. The Knowbot service environment is distributed as a potentially endless number and variety of what we call Knowbot service stations (software and/or hardware) operating at places on the network. The stations may generate, store, execute and delete Knowbot programs and otherwise perform all allowed operations on Knowbot programs as determined by the Knowbot program itself or by users authorized to take or enable such actions. The Knowbot framework defines a minimal set of rules 38 for the structure of Knowbot programs (for example, the program must include some information related to the task to be done) and a minimal set of rules 40 for the functions to be performed within the Knowbot service environment (for example, that a typical Knowbot service station be able to create, send, receive, monitor, and delete Knowbot programs).

Although we describe below some additional specific principles for Knowbot programs and the service environment, in general it is contemplated that enhancements to the Knowbot framework will be developed in a similar manner as for the Internet framework, that is by a combination of free market forces with respect to hardware and software implementations, and by an open standards development process within the Knowbot user community with respect to framework principles. Like the Internet framework, the Knowbot framework is meant to coexist freely with other techniques for doing tasks within a network and to be easily expandable.

In general, in one aspect, the invention features enabling tasks to be done on a network of multiple computers interconnected by communication links. Some or all of these computers may also be internal to the network. We use the term Courier, on occasion, to refer to a Knowbot program that is being sent from one service station to another, or is being exported (in some fashion) from the environment. At each of the computers, Knowbot programs may be received and transmitted on the communication links, and may be stored and created; and execution of the tasks associated with the Knowbot programs may be advanced. Each Knowbot program includes a globally unique identifier; navigation information that may define a route through the network (when applicable); and information concerning the task to be done. Knowbot programs which are clones of each other will use the same basic identifier with a version number or some other delimiter to distinguish among them.

In general, in another aspect, the invention features enabling a computer on a network of multiple computers interconnected by communication links to participate in a distributed Knowbot service environment by the steps recited above.

Implementations of the invention may include one or more of the following features.

A participant at a computer (e.g., a person or a process or a Knowbot program running on the computer) may define the task to be executed. Information related to the defined task may be embedded in one of the Knowbot programs. Task information contained in Knowbot programs may be interpreted. The step of advancing the execution of tasks may include: creating additional Knowbot programs, interacting with other Knowbot programs, interacting with repositories of digital objects; querying a database of information; applying stored expert knowledge; protocol transformation; providing a directory service identifying other locations which provide services related to the task; making a security determination; providing a "what's new" service to identify newly available information; providing a "clipping" service which extracts information; providing a version control service for managing versions of the Knowbot program; responding to actions of a user by obtaining execution of the task at another location without necessarily indicating to the user that the execution occurred at the other location; providing a method for determining the structure of a Knowbot program (e.g., to determine if a digital object is contained in the Knowbot program and to access the element; creating a derivative work from an existing work; generating a Knowbot program that contains another Knowbot program, or a digital object, or other data; and passing a message from a source Knowbot program to a target Knowbot program at a different location.

The information concerning a task to be done may include interpretable or executable instructions. The Knowbot program may include data in the form of a digital object or a Knowbot program (a Knowbot program may itself be a digital object). The digital object may include protocol transformation information.

In general, in another aspect, the invention features executing a local query of a remote database (or a remote knowledge-based system) via a communication channel of a network where the local query complies with a query protocol and the remote database is responsive to queries which comply with a database protocol. A Knowbot program is locally generated based on the local query and in compliance with a Knowbot program protocol. The Knowbot program is sent to the remote database via the communication channel of the network. At the remote database, the Knowbot program is serviced by querying the database in accordance with the database protocol. The results of the query are returned from the remote database within a return Knowbot program which complies with the Knowbot program protocol.

Implementations of the invention may include one or more of the following features. The return Knowbot program may be received locally and results may be provided to a user based on the results contained within the return Knowbot program. Additional Knowbot programs may be generated which are based on the local query and comply with the Knowbot program protocol. Each of the additional Knowbot programs may work in parallel on a given database or repository or may be sent to another database. At each of the other databases, the corresponding Knowbot programs may be serviced by querying the other database. The results of the query from each of the other databases may be returned within a return Knowbot program which complies with the Knowbot program protocol. The results contained within the return Knowbot programs may be processed locally to provide a consistent presentation to a user. The consistent presentation to the user may be updated as additional return Knowbot programs are received. The processing may include removing redundant information. The return Knowbot program may be a modified version of the original Knowbot program. Additional Knowbot programs may be generated locally and sent via communication channels of the network. Knowbot programs may be generated as well as received locally.

The query protocol may include a displayable or machine interpretable form, obtained from another program or completed by a user. The Knowbot program protocol may differ from the query protocol and from the database protocol. The Knowbot program protocol may include the identity and syntax of an executable programming language. The Knowbot program may include an executable programming language entry and a navigational entry. The Knowbot program may reach the remote database site by navigating the network, and the navigational portion of the message may include information related to the navigating. The remote database site may send a status Knowbot program indicating the status of execution of the query in machine interpretable form and/or in natural language (e.g., English). At the remote database, the Knowbot program may be stored during the querying of the database, and the querying of the database and the returning of the results may be controlled based on control information contained in the Knowbot program. A Knowbot service station may be used to create, send, receive, and delete Knowbot programs. At the remote database site, a Knowbot service station may be used to create, send, receive, control, process, and delete Knowbot programs. The remote database to which the Knowbot program will be sent is determined locally and automatically based on the local query. Sending the Knowbot program may include conforming the Knowbot program to an electronic mail protocol or a file transfer protocol or other communication method on the network. The Knowbot program protocol may include transformation information.

The Knowbot programs may include authentication information; scheduling information; and terms and conditions information.

Other advantages and features of the invention will become apparent from the following description and from the claims.

DESCRIPTION

Figure 1:
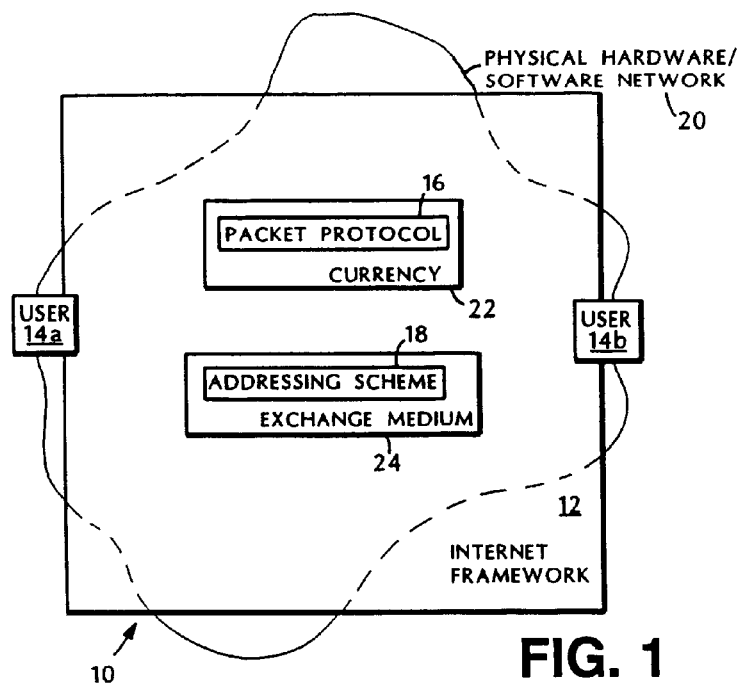
FIG. 1 is a block diagram of an Internet framework.
Figure 2:
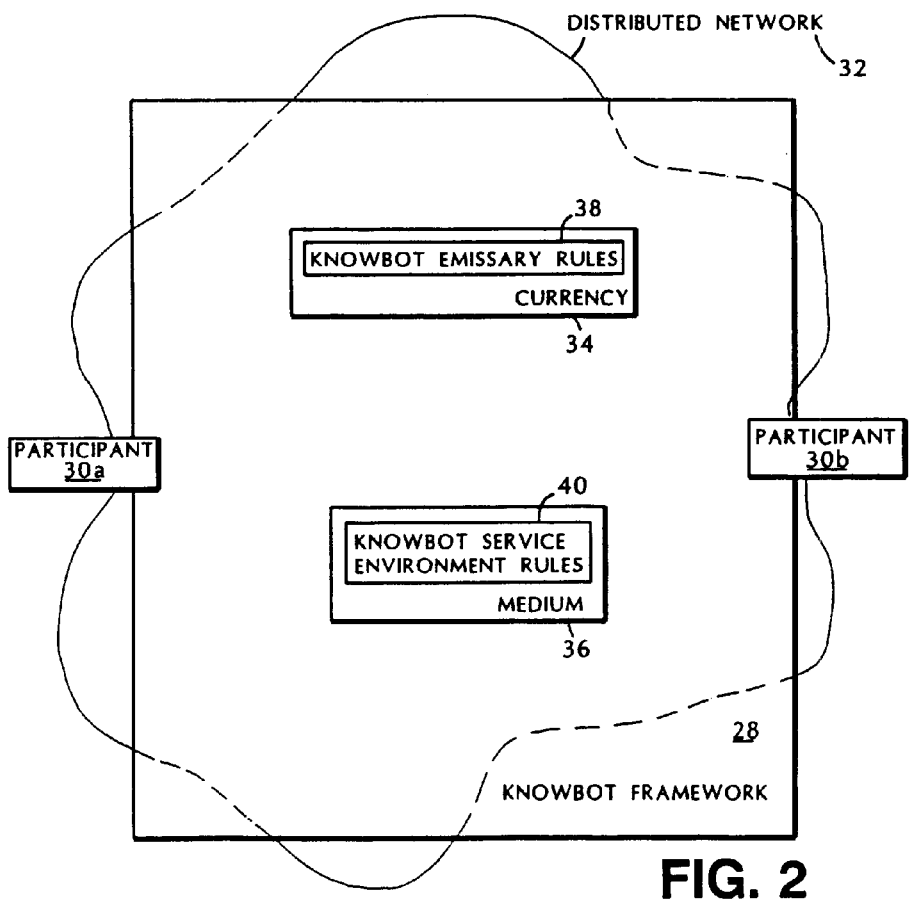
FIG. 2 is a block diagram of a Knowbot framework.
Figure 3:
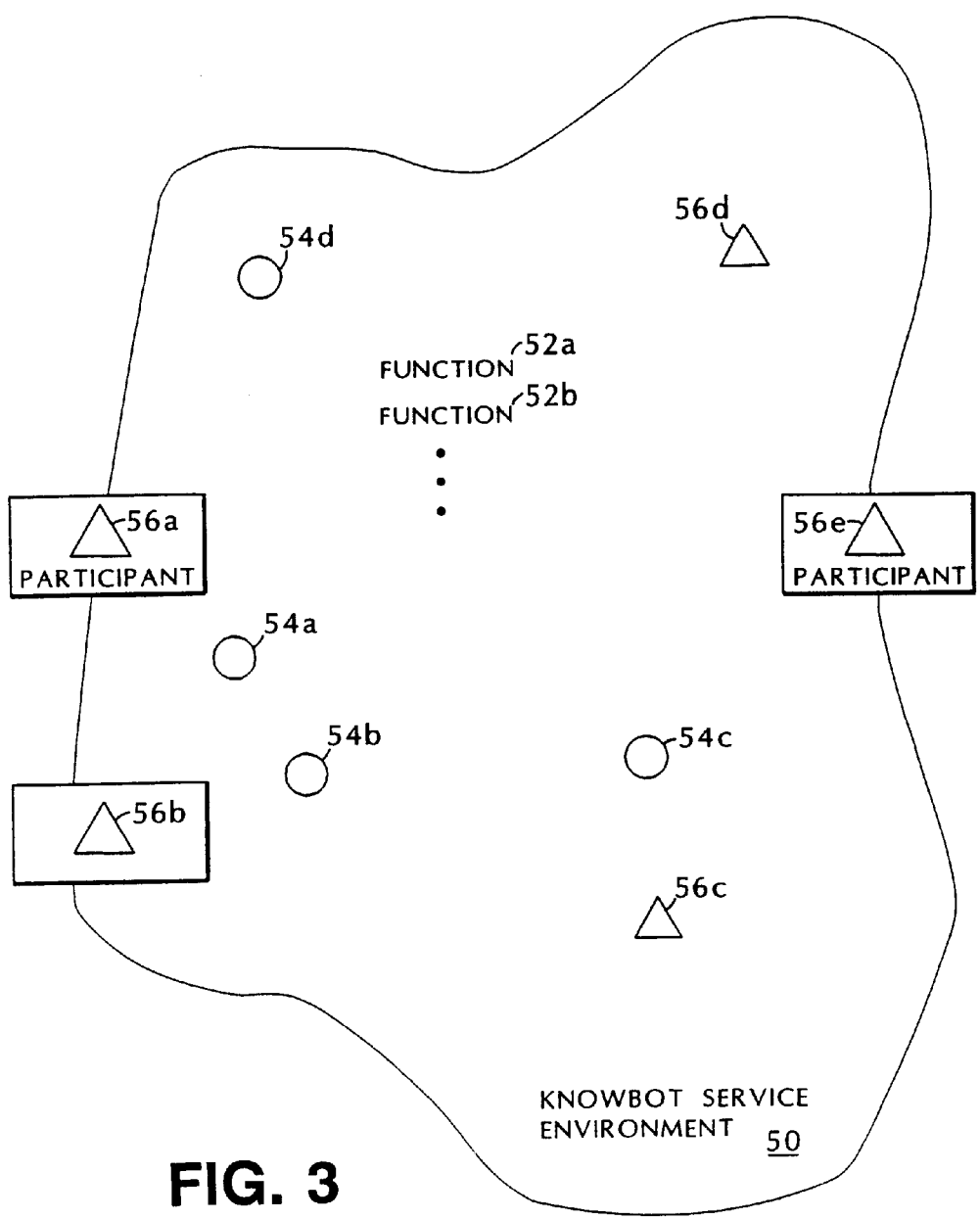
FIG. 3 is a block diagram of a Knowbot service environment.

FIG. 3 depicts the Knowbot service environment 50 which provides an extremely wide variety of functions 52a, 52b, . . . for handling Knowbot programs 54a, 54b, . . . via an essentially unlimited number and variety of Knowbot service stations 56a, 56b, . . . each in the form of hardware and software running at a location on a distributed network. Examples of Knowbot service stations would include software running on an individual user's PC or laptop (service station 56a) or on a repository or database server of a participant that is a supplier of digital objects (service station 56e), or on a smart card or other personal digital equipment or artifact, or on a telephone company central office switch (service station 56b).

Figure 11:
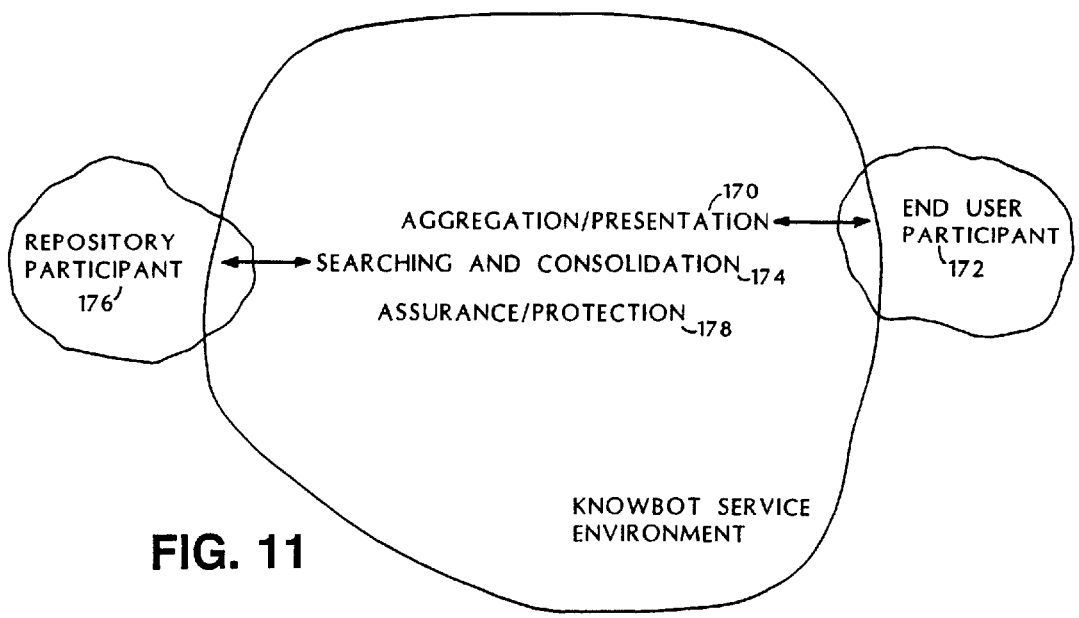
FIG. 11 is a block diagram of a Knowbot service environment.

As seen in FIG. 11 some of the most basic functions to be provided by the Knowbot service environment include aggregation and presentation services 170 which involve how information is collected and organized and presented to end user participants and how requests for tasks to be performed are elicited from end user participants 172; searching and consolidation services 174 which involve how queries are presented to repository participants 176 and other resources and how results are consolidated for presentation to these resources; and assurance/protection services 178 which validate the authenticity of Knowbot programs and Knowbot service stations and their performance, and that rights in digital objects will be effectively protected by these programs and service stations in accordance with stated terms and conditions. These services are discussed in more detail below.

Knowbot Service Stations

The Knowbot service station is analogous to an operating system but does not allow participants to create arbitrary programs and files or to run arbitrary programs, although it could allow selected users with special system status great flexibility to manage the service station and to upgrade its performance. In general, the service station creates Knowbot programs in response to participant specifications and/or its own internal requirements. Prospective Knowbot programs may also arrive from external sources such as a user's PC that is not also a service station and can be authenticated by a service station for use in the Knowbot environment. Prospective Knowbot programs may also arrive on external media such as CD-ROM. The service station also processes Knowbot programs received from other service stations, and stores and manages Knowbot programs within its own environment.

Figure 4A:
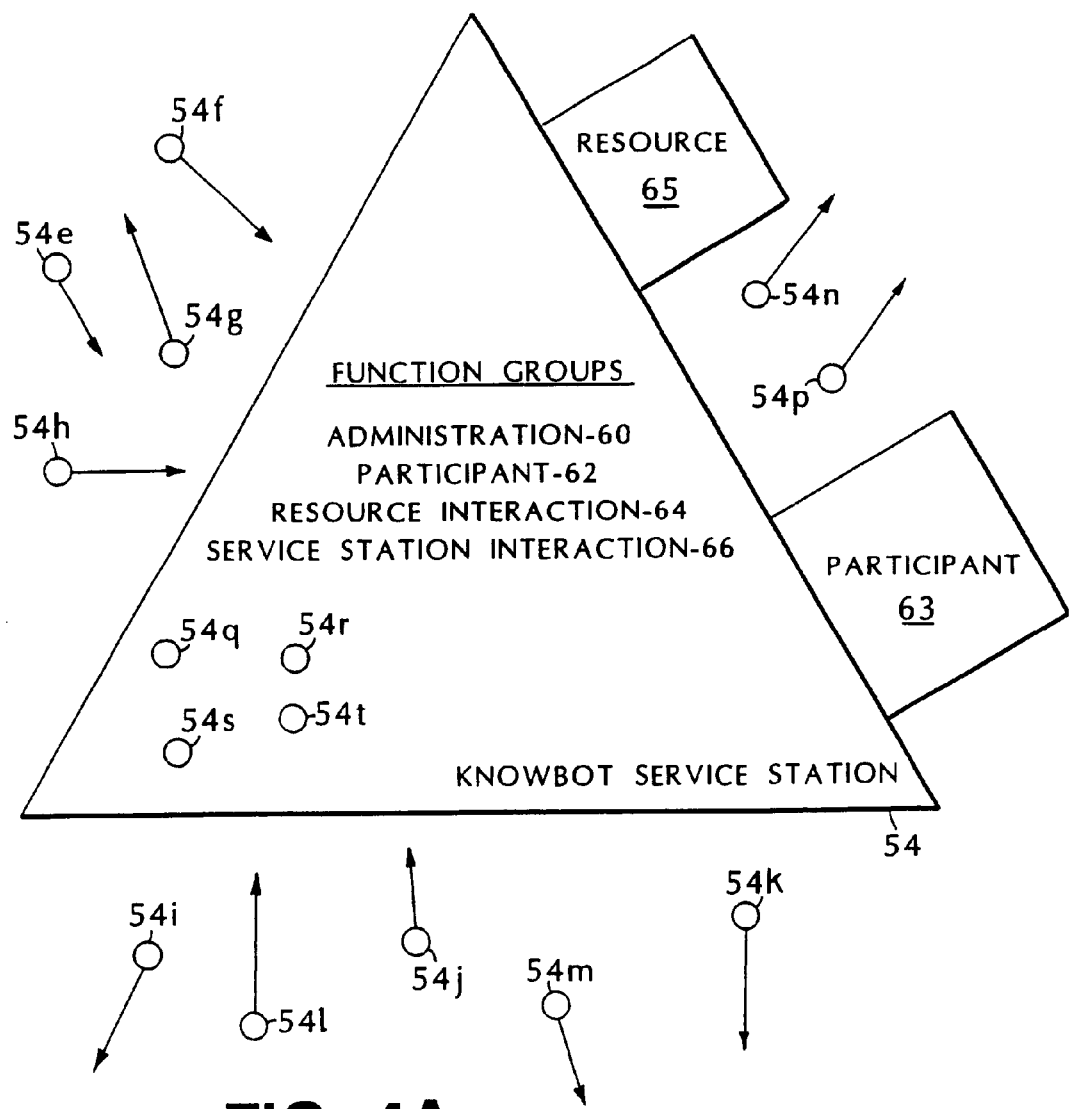
FIGS. 4A and 4B are block diagrams of Knowbot service stations.

As seen in FIG. 4, the functions performed at each service station may generally fall into four major categories: i. basic administration 60 of Knowbot programs, include creating, sending, receiving, authenticating, executing, storing, monitoring and deleting them; ii. interaction 62 with a participant 63 to aid the participant in defining tasks to be done and to provide the results of doing tasks in forms and at times that are useful; iii. interaction 64 with a participant which is serving as a resource 65 in getting a task done, including conveying requests for information or actions in formats and at times that will be understood by the resource and processing the information or results of the actions; and iv. interacting with other service stations 66 and interacting with hardware and software that is not part of the Knowbot framework to enable a limited set of external, possibly untrusted actions when appropriate and allowable.

Knowbot programs 54e through 54p may pass from Knowbot service station to Knowbot service station in the Knowbot service environment by a variety of mechanisms, for example by being transported in Internet packets. Knowbot programs 54*q* through 54*t* also may stay for periods of time in a given Knowbot service station and in that sense the host Knowbot service station may be thought of as a hotel and/or processing plant for Knowbot programs.

Figure 4B:
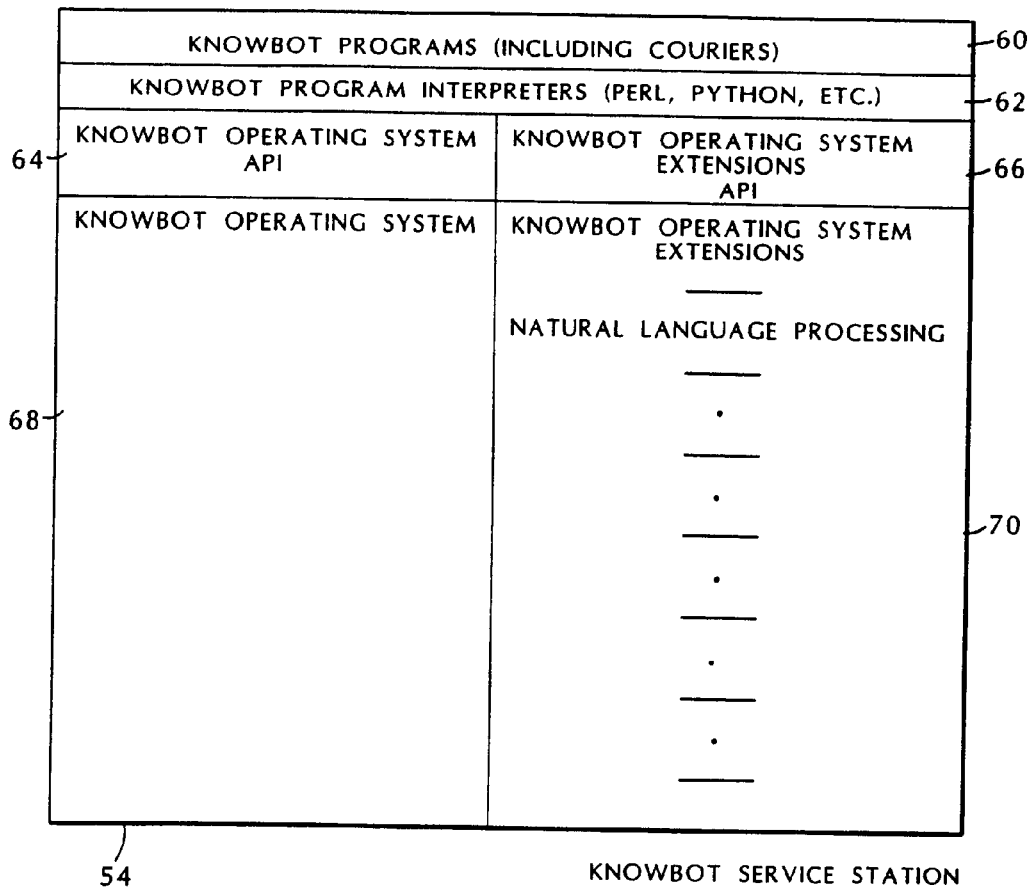

Referring to FIG. 4B, the general structure of a generic Knowbot service station includes storage 60 for Knowbot programs and Knowbot program interpreters 62 for interpreting Knowbot programs written in languages such as (but not limited to) PERL or PYTHON. A core Knowbot operating system 68 provides basic key functions (discussed below) and provides a Knowbot operating system application program interface (API) 64 which provides a predefined interface to and thus enables application programs to be easily written to interact with the operating system. A Knowbot operating system extensions API 66 provides an interface to extensions 70. The extensions can include an almost limitless variety of services and functions that supplement the basic functions of the operating system, such as natural language processing.

Simple Knowbot service stations need only be able to perform a small set of basic functions and they may be implemented easily and in a straightforward way in the form of a software program or VLSI chip. Other more complex Knowbot service stations will have a variety of special functions suitable to their locations in the network and to the entities with which they are expected to interact.

Figure 5:
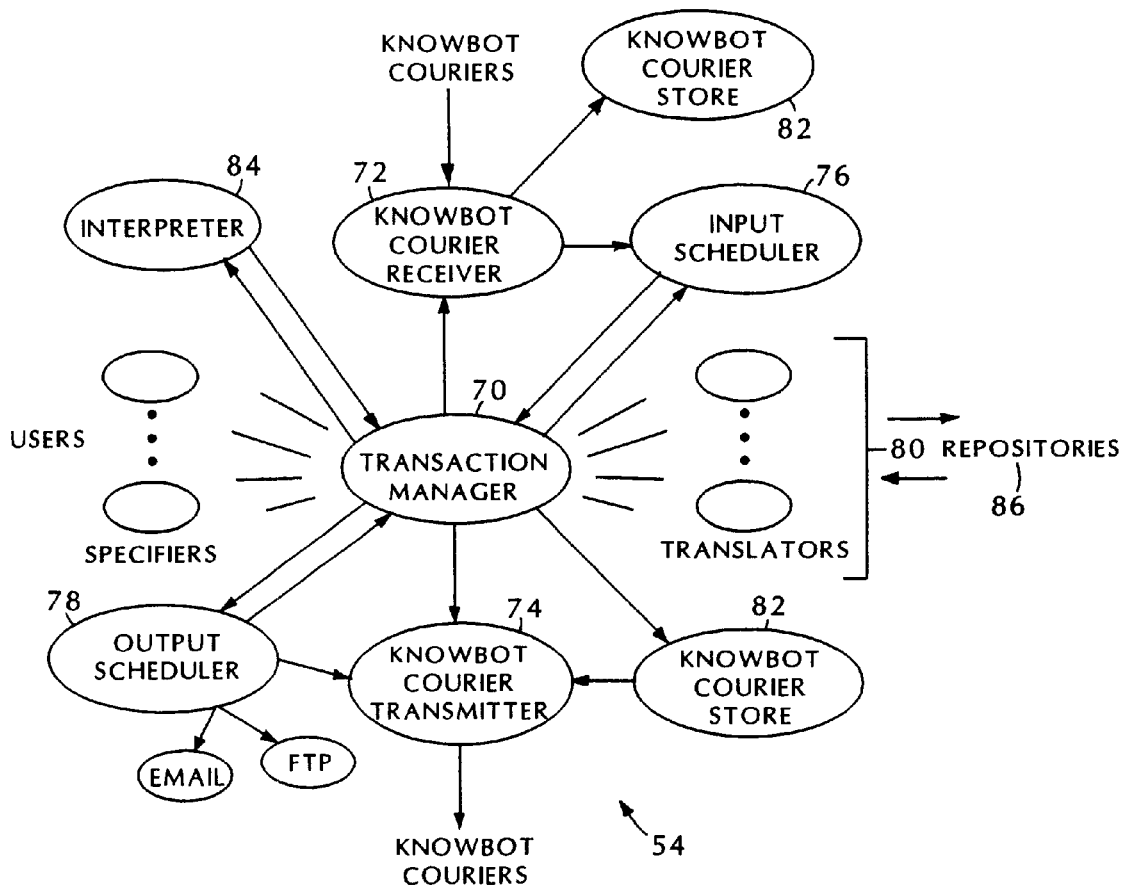
FIG. 5 is a block diagram of a transaction manager.

We turn to a discussion of a simple Knowbot service station with minimum basic functionality. As shown in FIG. 5, the heart of the Knowbot service station is the transaction manager 70 which acts as a kind of traffic cop and status handler to supervise activities within the service station. The transaction manager interacts with a Knowbot program receiver 72 where Knowbot programs arrive at the service station, and with a Knowbot program transmitter 74 where outgoing Knowbot programs depart the service station. An input scheduler 76 keeps track of the arrival of Knowbot programs and assures that they are scheduled for handling in the service station at the appropriate time. An output scheduler 78 similarly keeps track of Knowbot programs that are to be sent out of the service station and assures that they are transmitted in due course.

Knowbot programs that arrive from an external source go directly to the receiver. The receiver provides access control and evaluates whether the incoming Knowbot program may properly enter the service station. If so, it stores the program in a store 82. If not it may discard the program or take some corrective action with respect to it. Knowbot programs that are generated locally, e.g., from a resource at the same location as the service station, are generated by or handled by a translator or by a specifier and are passed to the transaction manager for further disposition. The transaction manager may place the locally generated program in a store for subsequent processing or transmission, or it may hand it directly to the transmitter for immediate dispatch.

The input and output schedulers determine what action to take with respect to each entry in the Knowbot program store. Actions could include performing steps called for by the program either immediately or at some later time or periodically or after some other event has occurred. When the time has come to perform such a processing step, the input scheduler notifies the transaction manager. When the time comes to transmit a program, the output scheduler notifies the transmitter.

The transaction manager manages all transactions in the service station and carries out periodic checks of status. It keeps track of ongoing transactions and notifies other service stations of status and error conditions (one way to provide the notice is by sending new Knowbot programs to the other service stations). The transaction manager maintains information about Knowbot programs created by the service station, and deletes Knowbot programs when appropriate. If it deletes a Knowbot program that originated in another service station it will generally notify the other service station of such action.

The transaction manager invokes the aid of an interpreter 84 to execute a Knowbot program. This may occur, for example, to determine whether a received Knowbot program is intended for a local user or for a local repository or for another site. The interpreter "interprets" the program (e.g., runs the Knowbot program) to determine what actions to take. If intended for a local user, the results of the interpretation are passed to a specifier which then communicates with the user. For example the specifier could deal with presentation matters such as what images can appear on a screen, or how many actions of a given type may be taken on behalf of the user. This information may be derived from the Knowbot program If intended for a local repository 86 (e.g., if the task represented by the program is to access some information in the repository), then the interpreted Knowbot program determines which repository to access and plans the execution method (e.g., serial or parallel, level of granularity, and how to order or combine the information). It then passes the results of the interpretation along with the program to one or more translators which then communicate with the repository. The translators convert the requests that are represented by the program to the language of the local repository. The local repository may be able to execute the request directly. If appropriate for another site then the transaction manager passes it to the transmitter for dispatch over the network to the intended site, which will generally be another service station but which may be a repository, a gateway, or some resource outside of the Knowbot service environment.

The repository search results would then be passed back through the translator which would format it, place it in the store 82, and notify the transaction manager. The transaction manager would then mark the transaction finished and make an entry in the output scheduler module.

The output scheduler provides a variety of return policies. Normally, the results would be returned in the form of a program in which case the transmitter 74 sends the program when and how indicated by the output scheduler. In addition, the results could be communicated in another medium (e.g., e-mail or file transfer) or made available in a suitable "markup language" for delivery. The markup language provides a self-describing form of information that denotes its substructure so that another interpretation is possible downstream. The results may be returned to the user or returned to a designated intermediate location for storage or processing.

Figure 6:
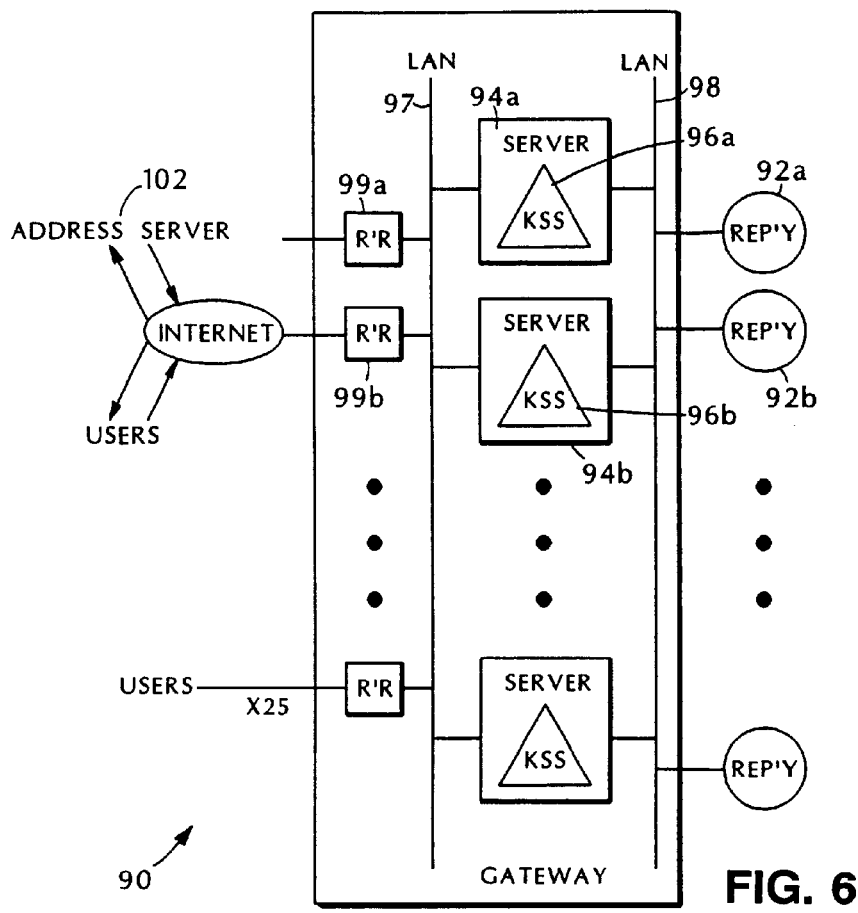
FIG. 6 is a block diagram of a gateway.

A more complicated system 90, shown in FIG. 6, could be used by a large provider of digital information stored in repositories 92*a*, 92*b*, . . . to make services accessible to a variety of users. The users may wish to submit materials for inclusion in the repositories or to access information (digital objects, see below) held in the repositories. The service provider would maintain a gateway that would include a number of servers 94*a*, 94*b*, . . . at least some of which would include Knowbot services stations 96*a*, 96*b*, . . . as well as other software associated with the management of the repositories and the gateway. Each of the servers could have an IP address. The servers may be connected to one or more local area networks (LANS) 97, 98, which may also serve the repositories and a set of routers 99a, 99b, . . . Each router would be connected to a communication link, including, for example, dial-up, wireless, X.25 link, or a connection to the Internet.

Users wishing to make queries to the repositories could form Knowbot programs which would first query an appropriate address server 102 to determine the IP address for the repository that could answer the query, and then would proceed to the router 99b. Router 99b would route the program to the appropriate one of the servers and the Knowbot service station there would interact with the appropriate repository to complete the query. Results could also be packaged in Knowbot programs and then returned via the Internet.

The Knowbot service stations in FIG. 6 interact with one another for the purpose of coordinating search requests and other activities.

Logical Structure and Operation of Knowbot Programs

Figure 7:
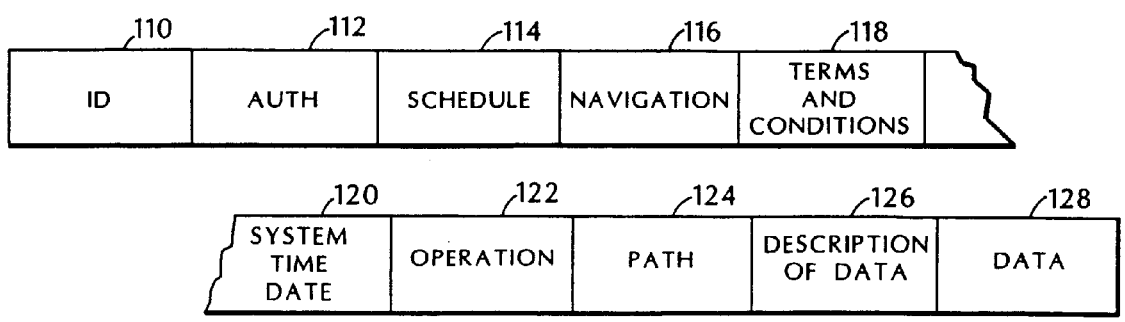
FIG. 7 is a diagram of the contents of a Knowbot program.

The logical structure of a Knowbot program is shown in FIG. 7 in the form of fields of information that may be included to help guide the program through the network and to provide instructions for its operation. The exact order of the fields is not significant and fields may be added or changed by the service stations as the Knowbot moves through the Knowbot service environment. In storage, various means of implementation are possible and many of the fields may be unnecessary and may be omitted.

The first field is a globally unique identifier 110 which distinguishes this Knowbot program from every other Knowbot program currently in existence in the Knowbot service environment. It may also be useful in distinguishing Knowbot programs over long periods of time. A portion of the identifier may be derived from the identity of the Knowbot service station that created the Knowbot program. The identifier may be used for retrieving a Knowbot program from storage or to refer to a Knowbot program. If the unique identifier has semantics, the Knowbot service station that created it will provide a type and version indicator to make clear what the semantics are, or this information may be contained in the system, time and date field mentioned below.

The globally unique identifier allows the existence, location, and activities of the Knowbot program to be controlled and determined with certainty while it exists in the Knowbot service environment.

The next (optional) field is authentication information 112 used to assure the authenticity of the Knowbot program, in particular that it was actually created by the environment that claims to have originated it. Portions or all of the Knowbot program may also be encrypted if desired.

The next field contains scheduling information 114 relating to when and how often the task represented by the Knowbot program is to be done. This may depend on cost and time constraints set forth in the field. This field may also identify required status information (including error information notifications). The scheduling information will generally assume content specific information is located elsewhere in the program. The scheduling information could indicate, for example, when the Knowbot program executes functions, how long it should exist, and when and how it should return status information. Specific examples of instructions for starting a task include (a) "run this Knowbot program tomorrow at 2 pm on repository X"; it might return a report on active Knowbot programs in the repository; (b) "run this Knowbot program everyday at noon on repository Y"; the results might be to say what has come in that is new that day; (c) "wait until event Z (e.g., we know which currency we want to use) and then run the Knowbot program using the results of that event," and (d) "run this Knowbot program and if event W occurs (e.g., the value of this stock ever goes below 15), take action Q (e.g., sell it), and if it goes above 20, buy it." The Knowbot program 174 may also include other wake-up criteria 182 and trigger conditions.

The next field, navigational information 116, may capture either information to control the future navigation of the program in the Knowbot service environment and/or information about the history of the navigational path taken by the program.

The next field, terms and conditions 118, relates to areas such as authorization of payment for tasks performed on behalf of the program or terms and conditions for use. This information is protected by use of public key encryption or some equivalent mechanism for authenticating payments and other terms and conditions. The payment information can indicate allowable credit limits, ensure authentication of payment, and may be completely contained in the Knowbot program or may be associated with digital cash payment systems or other electronic payment mechanisms.

The next field, system, time, and date of creation 120, provides a tracing mechanism in case the program is copied or a record of its history is needed. A program embedded in another program will have its own system, time, and date of creation. This field may also identify a Knowbot program that can acquire the information.

The next field, operation 122, typically would contain an instruction sequence to be executed in conjunction with the contents of the Knowbot program. Any language interpretable at the Knowbot service station is permissible. The instruction sequence could even be a digital representation of natural language (e.g., English) used in conjunction with a natural language understanding program to interpret it. Simple forms of the instruction sequence might be formatted search commands, or access commands such as "access object with identifier X," or "search for objects written by a specific named person." It may also identify a process to be carried out, such as "execute me and pass the results to the destination names in the results of the execution."

The next field, path 124, will generally identify the most recent service station to have handled the program, and it may also contain information about the series of service stations that previously handled the program along with the times when it was handled. In contrast to the navigation field which may contain incomplete information about future as well as previous trajectories, the path field is intended to yield the definitive record of the path actually taken.

The next field, description of data 126, will generally contain a unique identifier (known as a handle) for data, the rights associated with use of each part of data (see below), reporting requirements (if any), and directions for using the instruction sequence. The directions may be in the form of an executable program.

The final field, data 128, contains one or more of the following:

a. a digital object, by which we broadly mean sequences of digits (e.g., binary digits or bits) and an associated unique identifier which we call a "handle". A digital object may incorporate information or material in which rights (e.g., copyright rights) or other rights or interests are or may be claimed. There may also be rights associated with the digital object itself. Thus digital objects may include digital representations of conventional works (e.g., literary or pictorial), and more broadly any digital material which is capable of producing desired manifestations for a computer user. Thus, a digital object could include programs and other data which may be based on or incorporate one or more preexisting works. The digital object may be delivered over a network and subsequently rendered on a computer screen (or other output device or devices, e.g., a printer) in whole or in part. Digital objects may include digital representations of audio, video or even 3-D scenes and artifacts, as well as bit sequences that have the potential to be rendered in many different ways and which renderings may be occurring for the first time. By the notion of rights which are or may be claimed in a digital object, we mean rights which exist under statute (e.g., copyright, patent, trade secret, trademark), or as a result of private action (e.g., via secrecy, cooperative ventures, or negotiation).

b. a sequence of bits (possibly with a data type)

c. indirect references to other entities (such as digital objects)

d. a set of the above e. a combination of the above (including sets)

The contents description field allows the digital objects to be separately identified and processed with full cognizance of the rights and permissions associated with the contents. A digital object may itself be a Knowbot program.

Knowbot programs may communicate with each other as required to carry out tasks. Among the means for such communication are the following. 1. Multicast communication may be used to reach multiple other Knowbot programs or when the location of a target Knowbot program is not precisely known. 2. The source Knowbot program could send a message to a target Knowbot program by routing it via the Knowbot service station that created the target. 3. A mechanism could be used for direct communication from one Knowbot program to another.

In addition to a protocol or set of protocols defining how a Knowbot program is to be sent and received, the system may include a protocol or protocols defining how a message is to be sent and received. In some cases it may be more effective to send messages rather than to send the Knowbot programs themselves. E.g., a Knowbot program may arrive at a Knowbot service station and wait for a message from another Knowbot program before proceeding.

Knowbot programs may interact with each other in a Knowbot service station. Knowbot programs may be cloned in a Knowbot service station. Each Knowbot program clone may operate independently of its parent and siblings. Knowbot programs and their clones may coordinate their activities and cooperate in performing a task. More generally any Knowbot program may coordinate its work with any other Knowbot program, whether or not they are clones.

Knowbot programs may be persistent, that is they may be created with the expectation that they will maintain a vigilant presence in the Knowbot operating environment. Usually the persistent Knowbot program will reside at a particular Knowbot service station, but there may also be persistent Knowbot programs that are perpetually moving through the Knowbot operating environment.

A Knowbot program carrying a simple user query or system query may produce a complex retrieval process or other distributed task execution. Several repositories or databases may have to be interrogated to obtain all the necessary components to satisfy the retrieval or other task execution. (A repository may contain multiple databases or knowledge bases). These components may be delivered to the user as a single response or as multiple responses. In certain cases, the user may require and the system may allow all or some of the components to be delivered separately.

A Knowbot program may carry out a complex task (possibly in conjunction with other Knowbot programs, repositories, databases and/or knowledge bases) that does not correspond to a query or a retrieval. For example, it may make something happen in the network, or in a computer, or a set of computers or the network such as activating programs, setting parameters, or inserting software patches.

Authentication and Security

Knowbot programs and Knowbot service stations within the Knowbot service environment may be designated as "qualified entities," that provide certain assurances on system behavior although such assurances may not be possible for all service stations. Various levels of assurance may also be designated. For a service station, qualification amounts to registering the existence of the service station within the Knowbot service environment. The party applying for such registration would agree not to modify (or otherwise tamper with) the service station except as authorized. The service station could contain mechanisms to determine its own integrity (e.g., if it has been altered or its operation otherwise modified).

Knowbot programs arriving at a qualified service station may be allowed to be handled there without regard for the qualification of the service station which originated the program, provided the cost of execution is acceptable. For executions that are costly, electronic payment may be required to be authorized or included. If digital objects subject to rights (e.g., computer programs) or relating to rights (e.g., contracts or deeds) are requested for access, the Knowbot program may only be allowed to be returned to qualified service stations at a certain level of trust. A test may be made prior to performing the access to determine if the source service station of the program is qualified or not. Or, in a less restrictive scheme, the program may simply be limited in what can be done with the digital object.

For Knowbot programs, qualification may mean simply that a qualified service station was the creator of the program, assigned it a globally unique identifier, and maintains a copy of the Knowbot program along with any associated information. When a Knowbot program is deleted, a status message is returned to the service station that created it. This message may be deferred in delivery if that station is not available. Other mechanisms for notification in the event of long-lived Knowbot programs and relatively short-lived stations involve transfer of responsibility by notification to other stations.

A Knowbot program may itself be viewed as a digital object when stored in a repository maintained by or accessible to the service station which created it. A Knowbot program may be deleted at any time by any service station. The record of a Knowbot program may be deleted by the service station that created it, when it is no longer deemed useful to retain it.

Knowbot programs may request and/or receive digital objects which may be subject to claims of confidentiality or proprietary rights while resident in a given computer or while in transit over the network. Traditional network security technology such as public key encryption may be used for protection in transit and storage. The approach described here will assist in protecting digital objects during computer processing, subject to stated operations or types of usage. Certain informational material will have the requirement to have this form of protection while resident in the network environment. Only qualified service stations will be trusted to have access to this material. Knowbot programs resident in qualified service stations and in transit between qualified service stations are deemed to be trusted. Knowbot programs in all other environments and those not in transit between qualified service stations are assumed not to be trusted entities. Sources of Knowbot programs must be authenticated to insure that (in the return path) only qualified destinations can receive qualified Knowbot programs. Levels of qualification as well as encryption may also be designated and maintained with the system.

It is possible to use service stations and Knowbot programs without qualification, but there may be no guarantee made as to their ability to protect intellectual property.

A valid Knowbot program (e.g., one that has the required logical structure to be a Knowbot program) may be produced by any participant software that is capable of producing an appropriate Knowbot structure or meeting appropriate interface constraints to other software which can produce one. No constraints are placed on the participant side of the interface in creating a Knowbot program. The structure may also be in the form of an authorized or qualified Knowbot program if provided by or validated by an authorized or qualified Knowbot service station. The task description in a Knowbot program can be expressed in any language that can be interpreted, e.g., PERL scripts, PYTHON, and others. A Knowbot service station may support multiple language interpreters. A specific language interpreter may interpret certain structural portions of a Knowbot program expressed in another language. In any case, a qualified Knowbot program is only produced by a qualified Knowbot service station.

By operating within a qualified service station, qualified Knowbot programs are able to protect intellectual property in the Knowbot service environment. Requests for information from unqualified programs will only be fulfilled if the rights owners are willing to have their intellectual property sent to unqualified service stations. There is no technical restriction assumed to be placed on communication between unqualified programs or the type of activity that might take place. Thus, any information sent outside the qualified service station is subject to no further guarantees from a qualified service station. Such action will normally only be taken with the permission of the rights holder, if any. Such permission may be indicated in the terms and conditions field. Within the qualified service stations, however, rights and claims to rights will continue to be protected.

Record Keeping

Each Knowbot program may contain, name, or point to none or one or more digital objects. These will generally be subject to rights and interests. Enough information is contained in a program to determine which operations are allowed to be performed on each digital object and the reporting that is required.

Knowbot programs may produce retrievals from repositories, operations upon themselves, interactions between programs, and deposits into repositories. They may also be sent to qualified service stations. In certain cases, where permitted by the rights holders, they may also be sent to unqualified service stations.

Each service station will keep track of operations performed on each Knowbot program and will report back electronically as appropriate (on usage according to the terms and conditions contained in the Knowbot program) to a "notification authority," a logically distributed system which is a key part of the Knowbot service environment or the rights administration process of the rights holder. In some cases, notification will be required each time a significant event or operation takes place (e.g. executing a task on behalf of a Knowbot program which is based on or incorporates information or material subject to rights). In other cases, only periodic reporting will be required (e.g. monthly or every N events).

If the notification authority's system goes off the network, reporting requirements may be suspended, although local collection of information for later reporting may still be required. Alternately, users may be restricted from executing on behalf of the Knowbot programs under such circumstances if the requested level of notification is not possible. For example, certain applications may be time dependent and depend on replenishment of "electronic permits" over the network from the collection system (or more generally from a rights management system) in order to continue usage.

If a service station goes off the network and is not reconnected within a specified period of time, all Knowbot programs which must provide notification reporting may be rendered inoperable (for example due to service station storage constraints) until the service station is connected again and the notification system has been updated. Alternately, for this case a service station may be authorized by a rightsholder to remove any restrictions on activation of or reporting about Knowbot programs that contain any of his material. The Knowbot program could also be made to delete any reports that have been collected while disconnected from the collection station, if they are not needed.

Examples of Applications

The Knowbot framework enables a virtually endless variety of applications which make use of information stored in and services available at one or more computers in a network. The applications may perform complex tasks not limited to the typical simple access request for information on a single computer (e.g., at what network address should I send E-mail to Jim Daniels, or what is the public key for Jim Daniels?) or a single command to a remote server (e.g., issue a one-way plane ticket from Washington, D.C., to San Diego for Jim Daniels anytime on the 3rd of March, 1998). Instead the Knowbot framework allows a participant to seek information or to accomplish tasks which may need to be accumulated from or performed at multiple computers according to a strategy not known in advance and in which later steps in the strategy depend on the results of earlier steps in the strategy. The framework enables all of this to be accomplished transparently (or with notification, if requested) to the participant.

One broad class of applications involves responding to a single participant request for information which can only be obtained by accessing separate databases located at different remote locations on a network and assembling the information for coherent presentation to a user.

Figure 8:
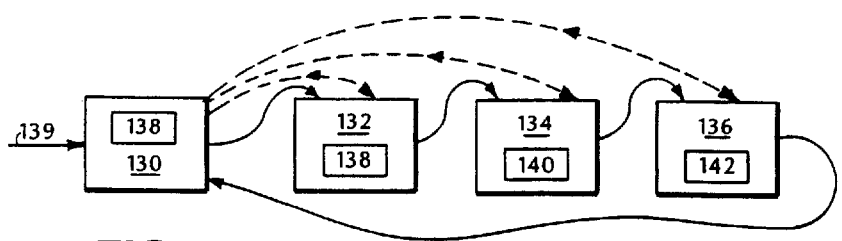
FIGS. 8 and 9 are block diagrams of serial and parallel search strategies.

In a specific example, FIG. 8, assuming there is no central registry for obtaining Internet addresses, if a user at a local computer 130 wants the Internet address of another user, the first user would enter a single request 130 identifying the other user. The local Knowbot service station 138 would interpret the request, create a corresponding Knowbot program and send it to a series of other computers 132, 134, 136, each of which has its own Knowbot service station, and each of which is known to maintain a user address directory. (This may be known in advance if the local computer's service station has a table of the addresses of computers which maintain such directories; otherwise, the service station must get it by sending a Knowbot program first to a computer known to have such a table.) Each of the directories 138, 140, 142 on computers 132, 134, 136 is likely to have its own naming and addressing conventions. The service station at computer 130 may be set up so that the user's query is phrased in accordance with a common protocol, and the service stations at the other computers may include conversion routines that convert the incoming request at each directory from the common protocol to a form that permits direct querying of that directory. The result of the query may then be inserted into the Knowbot program, which then proceeds to the next directory. Each of the service stations serves temporarily as a "hotel" for the Knowbot program during the time when the query is being executed there.

When the Knowbot program has completed its rounds and returns to computer 130 carrying the results of the multiple accesses, an extension or enhancement of the local service station may convert back from the common protocol to a format useful for local display of the information. The local service station enhancement may also organize the results in accordance with the user's preferences, before displaying them. For example the user may have asked for a display in reverse chronological order based on the most recent update of the entry, with the display showing the database or repository where each entry was found.

Having the Knowbot program perform this searching in round robin fashion as in FIG. 8 (i.e., serially, thus decentralizing task management) may take an unacceptably long period of time. An alternative scheme involves sending several Knowbot programs essentially simultaneously to the computers 132, 134, 136 and having them return independently to the originating computer 130 (as shown in dashed lines in FIG. 8) hopefully within a designated time-out period. This parallel approach to accumulating information (i.e., centralized task management) is especially important in reducing delay where the number of computers to be visited is large (as it often will be).

In another example, a user at a local computer may want to determine the current price of particular foreign long-term bonds in US dollars; the user may be unaware that this simple query actually requires fetching the price in a foreign currency and converting it to US dollars based on the current exchange rate. An extension or enhancement to the local Knowbot service station may provide a user interface that allows the user simply to phrase the problem to be answered, without naming the pieces of information that must be fetched. The service station would send one or more Knowbot programs to the proper remote nodes to fetch the needed information. Once the information has been returned, the local service station enhancement would use the current price and the conversion rate to determine the answer and would deliver the answer (but not necessarily the pieces of information) to the user. Since currency conversion may occur at multiple exchanges, the user will get an answer that is based on one (or more if desired) of the close but slightly differing exchange rates or upon an average of rates from several exchanges.

Figure 9:
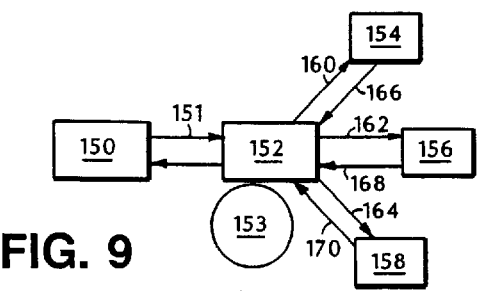

In this example, we assumed that the user would be able to formulate the problem to be solved, requiring only that the service station use Knowbot programs to get the missing pieces of information and then perform the computation. But suppose the user is only able to articulate the problem in non-mathematically precise words and needs help in converting the problem to a mathematical form and then solving it. The user could enter his query in words, e.g., "What is the likelihood of dollar sales for PCMCIA modems world-wide reaching $50 million in 1999?" As seen in FIG. 9, the local computer's service station extension or enhancement might first send a Knowbot program 151 to a remote service station 152 at a location which has an expert system 153 which contains knowledge on how to estimate dollar sales of a product. The program might carry a query along the lines of "What information do I need to know to answer the following question: . . . ?" The expert system 153 may provide the answer "Sales of the product in the past five years in the United States, population of the United States as a percentage of world population, and an estimate of the viability of the product in the face of specific new technology." Assuming that the answer also gave addresses of computers where the answers could be found (if not, the Knowbot program would have to make visits to other computers to get that information), the Knowbot program could then, with the aid of the service station 152 spawn three new Knowbot programs 160, 162, 164 addressed to three other computers 154, 156, 158 where the information is located. The programs could be sent in parallel or a single program could be sent serially. When the information is returned to service station 152 embedded in Knowbot programs 166, 168, 170, the original Knowbot program, which may have been waiting at service station 154, may then cause the three spawned programs to be deleted, and carry the results back to the service station 150. The answer then could be generated and displayed.

The service stations and Knowbot programs offer a rich framework for controlling access to, use of, and compensation for digital objects located at computers in a way which should encourage creators of and other owners of rights in digital objects to make them available on the network. By the notion of rights in a digital object, we mean rights which exist under statute (e.g., copyright, patent, trade secret, trademark), or as a result of private action (e.g., via secrecy, cooperative ventures, or negotiation). Additional information concerning repositories and control of digital objects is set forth in U.S. patent application Ser. No. 08/142,161, filed Oct. 22, 1993, assigned to the same assignee as this application, and incorporated by reference.

A creator or owner of a digital object typically will want to be able to control its use, reproduction, and accesses or performances, and to be compensated for permitting those acts. For example, the owner of a digital object whose data will manifest an image of George Washington when interpreted by the receiver ("the George Washington data") 150 may wish to charge less for a single use by a high school teacher than for multiple uses by an advertising agency. To prevent the George Washington data sent to the high school from being delivered to an unauthorized third party, the Knowbot program used to carry an encrypted version of the data on the network to the high school may also carry instructions which, by interaction with the service station at the high school, restrict access to the encrypted data to a specified computer and for use with a specified registered copy of software at the high school.

A creator or owner of a digital object also may wish to receive reports on the uses, reproductions, and disseminations of its digital objects, for example to seek payment or to cross-check payments that have been received, or may merely wish to keep statistical information. Knowbot programs may interact with the service station to provide this service. In the George Washington data example, the owner may attach a price schedule to the data which is carried by the Knowbot program that is transporting it. The owner's Knowbot program may then, through interaction with the service station at the user's site, negotiate, in effect, with the purchasing computer with respect to a potential use for the data. Or the price may have been predetermined. If the customer agrees to a price, the owner's Knowbot program may permit access to the object and then report the new "purchase" to the owner.

The Knowbot program may use payment mechanisms already available on the network automatically to collect payment for ongoing uses of the digital object, according to a payment schedule that is either attached to the digital object (Knowbot programs could be stored in a repository with the digital object and the payment schedule packaged together) or available elsewhere on the network. The owner of the George Washington data 150 could maintain a bank account or funds account on the network. The owner's Knowbot program could then conduct complete transactions with purchasers of the object, ending with the transfer of funds from the purchasers to the owners account on the network. The funds may take the form of direct money transfers, digital cash, or credit card (such as Visa or Mastercard) charges. In addition, other trusted authorization servers could be used.

The Knowbot program also could serve to control the use of a digital object as part of a derivative work being generated by a user. For example, the owner of the George Washington data could choose to permit a reduced resolution version of the representation to be altered for use in an on-line work about American history or a black and white representation to be created from a colored version. A Knowbot program could control access to the derivative work in the network, and could report the number of accesses back to the owner. The owner could arrange for the Knowbot program to take care of the payment transaction automatically, as discussed above. In general, Knowbot programs could retain information about the derivation trail of a derivative work.

The Knowbot program itself may be involved in the creation of derivative works based on existing works. This could involve the Knowbot program adding new material to an existing work recasting an existing work.

Just as the owner of a digital object wants to be paid for its use, the user of digital objects wants to make sure he does not unknowingly run up an intolerably high bill for accesses to digital objects. A Knowbot program sent out to accumulate information on a topic could automatically and without the sender's knowledge run up fees for accessing digital objects at many remote locations in the network. For example, a user might launch a query that would have the inadvertent effect of seeking out and purchasing every available piece of information on sailboats. A service module could be included in the service station located at the requester's site which would prevent Knowbot programs launched by that service station from accumulating charges greater than some amount decided by the user via a screen-displayed form or it could help select the best set of sites to access for a given budget.

Another use for Knowbot programs could be in giving access to a combination of clinical data for a particular patient and a medical database. In a specific example, the Knowbot program would retrieve the patient's temperature and related information from the network and compare the temperature to applicable norms as described in the medical database. If the Knowbot program determines that the patient has a fever, the Knowbot program could access treatment information in the medical database and then find an appropriate treatment schedule all on the same mission.

Knowbot programs may be used for network support and assistance jobs. For example, a service station may serve as a layer of protection between a database and the information consumer, to prevent overloading of the database and to prevent intrusions that may damage the database. Knowbot programs could also help diagnose problems in the network. Knowbot programs may gather traffic, use, and system status information and then make reports on and also repairs to the network based on this information.

A database gatekeeper for Knowbot program inquiries would receive Knowbot inquiries in a buffer store and then apply the inquiries to the database at regular intervals to help prevent overloading the system containing the database. In addition, the gatekeeper is designed to provide a layer of protection for the database against intrusions that may damage the database during handling of inquiries.

Existing database equipment and storage devices may be updated with new service station software and possibly new hardware to provide a standard Knowbot program interface to the storage devices without losing the value of existing equipment and data.

A Knowbot program sent from a service station may include or indirectly access a knowledge-based or expert system with knowledge inputted using rules, frames, and scripts and possibly natural language.

A Knowbot program may be used for administrative tasks such as managing library resources, organizing resources, characterizing data streams, coordinating among digital objects, determining structure of Knowbot programs, digital objects and other data, and building links among digital objects. A Knowbot program may be involved in managing interaction with distributed resources, including assisting in soliciting and managing bids. For example, the Knowbot program may ask the same question of a number of bidders and then organize the answers for the user. In another example, the user may authorize the Knowbot program to automatically select a bidder using a cost-to-quality ratio or similar formula. If the user is not especially concerned with quality, the Knowbot program automatically selects the lowest bid for the user. Alternatively, the Knowbot program is authorized to take the time of delivery into account.

A Knowbot program could be used to protect sensitive or confidential information. In this case, the terms and conditions might be based on the identity of the user and his need to know.

A Knowbot program may be involved in a smart directory service. The Knowbot program would take the user's profile and seek out and organize directory information for the user, updating the information as the user's profile changes. For example, if the user's profile reflects the user's interest in being aware of all Italian restaurants within a five-minute drive of the user's present location, the Knowbot program would update the user's directory entries for Italian restaurants as the user's location changes.

Knowbot service stations could include third-party value-added service providers that facilitate the transfer of information from information providers to information consumers. These third-party providers could be clearinghouses, catalogers, and routers; or "what's new" providers of information about new services and resources available on the network; or a reference information server that provides identification information about digital objects and other information in the network; or a browsing server that would help a user or a Knowbot program to find information based on only broad criteria about the desired information; or a query adviser that would help a Knowbot program in developing proper queries for representing a user's original search question; or a database rating service.

Service providers could maintain sophisticated computer programs, such as writing quality analyzers, oil exploration analyzers, and patent application analyzers, and use those works to provide value-added services on the network.

A Knowbot program created by an information provider could carry information from a repository, and then return to the information provider a confirmation of delivery.

Figure 10:
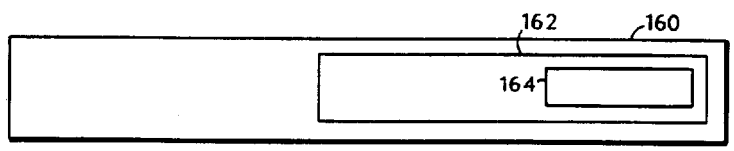
FIG. 10 is a diagram of a Knowbot program.

As shown in FIG. 10, Knowbot programs may be nested with a first Knowbot program 160 containing a second Knowbot program 162 which in turn holds retrieved information 164. The second Knowbot program helps the information provider with access control (e.g., authorized execution, replication protection) because it can keep track of and control access (e.g., execution, replication) of the retrieved information. Also, the second Knowbot program may help with intellectual property protection because it can keep track of and limit access to retrieved information depending on the authorization of the party seeking access.

A Knowbot program may have as its mission the elimination of corrupted or garbage data or information from a system or network. It could do this by traveling from service station to service station at each of which it could examine programs located there for corrupt formats or lapsed lifetimes.

A Knowbot program could provide protocol conversion or other interpretation services between heterogeneous systems and applications. The intervening network need take no part in the conversion process.

An information provider such as a university which wants to make its journal articles accessible on a network could set up a Knowbot value-added service module as part of a service station. The module is accessed over the network (in natural language or some structured classification scheme) and the input received is used to guide a search of the repository for the digital representation of the articles, identify the relevant data to the potential consumer Knowbot program, and negotiate a sale. The consumer Knowbot program either has the capability of agreeing to terms and conditions or requiring that the data be sent to the user who then makes the decision about whether to purchase.

In another application, a Knowbot program visits a story board generating program and then stores the requested story board. Next, the Knowbot program visits a music-generating program, a graphics-generating program, a text-generating program, and a video-generating program. The Knowbot program that returns to the user contains a computer program (sometimes called a multimedia work) or a digital representation of the components of the work that incorporates digital representations of the automatically generated components. A similar process could be used for producing other digital objects.

In another example, a Knowbot program acts on behalf of a user who wants to buy a bed for her bedroom and a table for her living room. The user's local service station has access to knowledge about the kinds of questions to ask of the user and generally where to find information. The service station drives an interactive program that obtains dimension information from the user, and also knows that it needs to find out who manufactures beds and tables. The service station sends a Knowbot program to learn about manufacturers and receives multiple answers.

In another illustration, multiple Knowbot programs contain instructions on what to do in reaction to the actions of other programs. This could be used in a war games simulation, where a Knowbot program would be analogous to a tank that has distinct properties and capabilities. Here the Knowbot program is an active ongoing entity whose existence continues throughout the simulation.

Such a scheme could be used in assisting the modeling of new complex systems such as a new airplane. Computations for modeling each part of the airplane, such as a wing, could be done separately and then the interactions of the parts could be managed through Knowbot programs.

In the case of database queries, a Knowbot program could operate by taking a request for information from a form filled out by the user and then, for each database to be searched, converting the request with the aid of a specialized thesaurus in the service station, into the proper query format for that database.

Alternatively, each database could be associated with a service station having a standard Knowbot interface capable of receiving and understanding standard Knowbot program requests for information. The Knowbot program need only convert user requests into the standard format before making queries of a database. Using a standard format helps in maintaining the quality and integrity of the information retrieval capability. It also enables a data carrier entity to do business in information transfer, such as connecting a seeker of information with a source of information, without having to become involved in format conversion activities. The carrier entity is thus enabled to add value in addition to simply delivering the data, such as automatically connecting a consumer of a data service with the most cost-effective provider of the service.

What is claimed is:

1. A method for enabling tasks to be done on a network comprising computers and a communication medium, comprising, at each of the computers, receiving mobile programs over the network, each mobile program having a structure of parts arranged to enable the structure and the parts to be commonly understood and processed at any of the computers in the network, the structure including an identifier that is globally unique at a given time across the network and that permits the existence and location of the mobile program to be controlled and determined at any of the computers in the network for at least as long as the mobile program exists; navigation information defining a route through the network; and information concerning a task to be done, the information being expressed in a manner that permits it to be interpreted at any of the computers in the network, at each of the computers in the network, advancing the execution of tasks associated with the mobile programs, storing the mobile programs, creating the mobile programs, and communicating the mobile programs over the network.

2. A method for enabling a computer on a network comprising computers and a communication medium to participate in a distributed mobile-program service environment, comprising, at the computer receiving mobile programs over the network, each mobile program including an identifier that is globally unique at a given time across the network and that permits the existence and location of the mobile program to be controlled and determined at any of the computers in the network for at least as long as the mobile program exists; navigation information defining a route through the network; and information concerning a task to be done, the information being expressed in a manner that permits it to be interpreted at any of the computers in the network, at each of the computers in the network, advancing the execution of tasks associated with the mobile programs, storing the mobile programs, creating the mobile programs, and communicating the mobile programs over the network.

3. The method of claim 1 or 2 further comprising interacting with a participant at the computer to enable the participant to define the task to be executed, and embedding information related to the defined task in one of the mobile programs.

4. The method of claim 3 wherein the participant comprises a person.

5. The method of claim 3 wherein the participant comprises a process running on a computer.

6. The method of claim 3 wherein the participant comprises a mobile program running on a computer.

7. The method of claim 1 or 2 further comprising, at the computer, interpreting task information contained in mobile programs.

8. The method of claim 1 or 2 wherein the step of advancing the execution of tasks includes interacting with repositories of digital objects.

9. The method of claim 1 or 2 wherein the step of advancing the execution of a task includes querying a database of information or other data.

10. The method of claim 1 or 2 wherein the information concerning a task to be done includes interpretable or executable instructions.

11. The method of claim 1 or 2 wherein the step of advancing the execution of a task includes applying stored expert knowledge.

12. The method of claim 1 or 2 wherein the mobile program also contains a digital object.

13. The method of claim 12 wherein the digital object includes protocol transformation information.

14. The method of claim 1 or 2 wherein the step of advancing the execution of a task includes protocol transformation.

15. The method of claim 1 or 2 wherein the step of advancing the execution of a task includes providing a directory service identifying other locations which provide services related to the task.

16. The method of claim 1 or 2 wherein the step of advancing the execution of a task includes making a security determination.

17. The method of claim 1 or 2 wherein the step of advancing execution of a task includes providing a "what's new" service.

18. The method of claim 1 or 2 wherein the step of advancing execution of a task includes providing a "clipping" or "abstracting" service.

19. The method of claim 1 or 2 wherein the step of advancing execution of a task includes providing a version control service for managing versions of the mobile program.

20. The method of claim 1 or 2 wherein the step of advancing execution of a task includes determining the structure of a mobile program and for accessing its elements.

21. The method of claim 1 or 2 wherein the step of advancing execution of a task includes responding to actions of a user by obtaining execution of the task at another location without indicating to the user that the execution occurred at the other location.

22. The method of claim 1 or 2 wherein the step of advancing execution of a task includes creating a derivative work from an existing work.

23. The method of claim 1 or 2 wherein the step of advancing execution of a task includes generating another mobile program.

24. The method of claim 1 or 2 wherein the step of advancing execution of a task includes passing a message from a source mobile program to a target mobile program at the same location or at a different location.

25. The method of claim 24 wherein the same message is passed to multiple mobile programs.

26. A method for executing a local query of a remote repository via a communication medium of a network where the local query complies with a query protocol and the remote repository is responsive to queries which comply with a repository protocol, comprising
locally generating a mobile program which is based on the local query and complies with a mobile program protocol,
sending the mobile program to the remote repository via the communication channel of the network,
at the remote repository, responding to the mobile program by querying the repository in accordance with the repository protocol, and
returning the results of the query from the remote repository within a return mobile program which complies with the mobile-program protocol.

27. The method of claim 26 further comprising
locally receiving the return mobile program, and
providing results to a user based on the results contained within the return mobile program.

28. The method of claim 26 further comprising
generating additional mobile programs which are based on the local query and comply with the mobile-program protocol,
sending each of the additional mobile programs to another repository, and
at each of the other repositories, responding to the corresponding mobile programs by querying the other repository, and
returning the results of the query from each of the other repositories within a return mobile program which complies with the mobile-program protocol.

29. The method of claim 28 further comprising
locally receiving the return mobile programs, and
processing the results contained within the return mobile programs to provide a consistent presentation to a user.

30. The method of claim 29 wherein the consistent presentation to the user is updated as additional return mobile programs are received.

31. The method of claim 29 wherein the processing includes removing redundant information.

32. The method of claim 26 wherein the return mobile program is a modified version of the original mobile program.

33. The method of claim 26 wherein the additional mobile programs are generated locally and sent via a communication medium of the network.

34. The method of claim 26 wherein additional mobile programs are sent locally and where return mobile programs corresponding to the original mobile program are received locally.

35. The method of claim 26 wherein the query protocol comprises a displayed form, completed by a user.

36. The method of claim 26 wherein the mobile program protocol differs from the query protocol and from the repository protocol.

37. The method of claim 26 wherein the mobile program protocol invokes the syntax of an executable interpretive programming language.

38. The method of claim 26 wherein the mobile program comprises an executable interpretive programming language portion and a navigational portion.

39. The method of claim 38 wherein the mobile program reaches the remote repository site by navigating the network, and wherein the navigational portion of the mobile program comprises information related to the navigating.

40. The method of claim 26 further comprising at the remote repository site sending a status mobile program indicating the status of execution of the query.

41. The method of claim 26 further comprising
at the remote repository, executing the mobile program to determine an appropriate repository query, storing the mobile program during the querying of the repository and controlling the querying of the repository and the returning of the results based on control information contained in the mobile program.

42. The method of claim 26 further comprising
locally using a mobile-program service station to create, send, receive, and delete mobile programs.

43. The method of claim 26 further comprising
at the remote repository site, using a mobile-program service station to create, send, receive, control, process, and delete mobile programs.

44. The method of claim 26 further comprising
locally and automatically selecting the remote repository to which the mobile program will be sent based on the local query.

45. The method of claim 26 wherein sending the mobile program includes conforming the mobile program to an electronic mail protocol or a file transfer protocol or other communication method on the network.

46. The method of claim 26 further comprising
including in the mobile program, protocol transformation information.

47. The method of claim 1 or 2 wherein the mobile programs further include authentication information.

48. The method of claim 1 or 2 wherein the mobile programs further include scheduling information.

49. The method of claim 1 or 2 wherein the mobile programs further include payment information.

50. The method of claim 1 or 2 wherein the mobile program is persistent.

51. Apparatus for enabling tasks to be done on a network comprising computers and a communication medium, comprising
a mobile-program service environment including, at each of the computers on the network, a mobile-program service station in the form of software running on a computer, the service station providing services which include
receiving mobile programs over the network, each mobile program having a structure of parts arranged to enable the structure and the parts to be commonly understood and processed at any of the computers in the network, the structure including an identifier that is globally unique across the network and that permits the existence and location of the mobile program to be controlled and determined at any of the computers in the network for at least as long as the mobile program exists; navigation information defining a route through the network; and information concerning a task to be done, the information being expressed in a manner that permits it to be interpreted at any of the computers in the network,
advancing the execution of tasks associated with the mobile programs at each of the computers in the network,
storing the mobile programs,
creating the mobile programs, and
communicating the mobile program over the network.

52. A method for executing a local query of a remote knowledge-based system via a communication medium of a network where the local query complies with a query protocol and the remote knowledge-based system is responsive to queries which comply with a knowledge-based system protocol, comprising
locally generating a mobile program which is based on the local query and complies with a mobile program protocol,
sending the mobile program to the remote knowledge-based system via the communication medium of the network,
at the remote knowledge-based system, responding to the mobile program by querying the knowledge-based system in accordance with the knowledge-based system protocol, and
returning the results of the query from the remote knowledge-based system within a return mobile program which complies with the mobile program protocol.

53. A method for retrieving a digital object from a remote system, in which
the remote system incorporates the object in a mobile program,
the mobile program is sent to the local system,
a local user accesses the digital object via the mobile program,
the mobile program restricts access to portions of the object, requiring additional authorization and/or payment for access to the object, and
notification is provided with respect to actions that are performed on the object.

54. The method of claim 53 in which the mobile program is itself a digital object.

55. The method of claim 53 in which at least some of the mobile program stays at the local system for a period of time.

56. The method of claim 54 in which at least some of the mobile program stays at the local system for a period of time.

57. The method of claim 53, 54, 55, or 56 in which notification is provided as actions are performed on the object.

58. The method of claim 53, 54, 55, or 56 in which information about actions performed on the object is recorded.

59. The method of claim 57 in which information about actions performed on the object is recorded.

* * * * *